United States Patent [19]

Wecker et al.

[11] Patent Number: 5,137,588
[45] Date of Patent: Aug. 11, 1992

[54] PROCESS FOR THE PRODUCTION OF AN ANISOTROPIC MAGNETIC MATERIAL BASED UPON THE SM-FE-N SYSTEM

[75] Inventors: Joachim Wecker, Erlangen; Ludwig Schultz, Bubenreuth; Matthias Katter, Dechsendorf; Kurt Schnitzke, Neunkirchen A Brand, all of Fed. Rep. of Germany

[73] Assignee: Siemens Aktiengesellschaft, Berlin & Munich, Fed. Rep. of Germany

[21] Appl. No.: 736,016

[22] Filed: Jul. 25, 1991

[30] Foreign Application Priority Data

Aug. 9, 1990 [DE] Fed. Rep. of Germany ....... 4025277

[51] Int. Cl.$^5$ .............................................. H01F 1/02
[52] U.S. Cl. ...................................... 148/103; 148/104; 419/13; 419/29; 419/53
[58] Field of Search .................. 148/101, 104, 103; 419/13, 29, 53

[56] References Cited

U.S. PATENT DOCUMENTS 4,837,114 6/1989 Hamada et al. .................... 427/127
4,902,357 2/1990 Imaizumi ............................ 148/103

FOREIGN PATENT DOCUMENTS 0134304 3/1985 European Pat. Off. .

OTHER PUBLICATIONS

J. Appl. Phys., vol. 64, 1988, pp. 5720-5722, "Magnetic Properties And Synthesis Of High iHc Sm-Ti-Fe", N. Kamprath et al.
Nato Advanced Study Institute . . . , Jun.-Jul. 1990, "Improved Magnetic Properties By Treatment Of Iron Based Rare Earth Intermetallic Compounds In Amonia", J. M. D. Coey et al.

*Primary Examiner*—John P. Sheehan
*Attorney, Agent, or Firm*—Kenyon & Kenyon

[57] ABSTRACT

Magnet material of the Sm-Fe-N system having a crystalline, hard magentic phase with a $Th_2Zn_{17}$ crystal structure, wherein N atoms are incorporated into the crystal lattice, is produced. First a preliminary product is formed by sintering a Sm-Fe powder which is oriented in a magnetic field to provide a sintered body having a two-component Sm-Fe phase. The sintered body is heat treated in a nitrogen atmosphere to form the Sm-Fe-N hard magnetic phase. The nitrogen atomosphere may advantageously be reactive nitrogen.

16 Claims, 1 Drawing Sheet

PROCESS FOR THE PRODUCTION OF AN ANISOTROPIC MAGNETIC MATERIAL BASED UPON THE SM-FE-N SYSTEM

FIELD OF THE INVENTION

This invention relates to processes for the production of an anisotropic magnetic material based upon the Sm—Fe—N substance system which has a crystalline, hard magnetic phase with $Th_2Zn_{17}$ crystal structure, wherein N atoms are incorporated in the crystal lattice. In this process, a preliminary product of the magnetic material to be produced having a two-component Sm—Fe phase with a composition at least largely corresponding to the constitution of the crystal structure is heated in a nitrogen atmosphere.

BACKGROUND OF THE INVENTION

For some years, magnetic materials have been known based on substance systems which contain a rare earth metal and a transition metal and are outstanding for their high coercive field strength $H_{ci}$ and high energy products $(B^*H)_{max}$. Important representatives are Co—Sm binary substance systems and Nd—Fe—B ternary substance systems. Their hard magnetic properties are due to intermetallic compounds with a high magnetic anisotropy and a high structure development in the respective materials. The production of these magnetic materials can be effected, e.g., by sintering powders of the components of the respective substance system (see, e.g., EP-A-0134304). Another possibility is to produce corresponding magnetic materials by means of a so-called rapid solidification (quenching) technology (see, e.g., EP-A-0284832).

Sm—Fe—Ti ternary magnetic materials are also being discussed (see, "J.Appl.Phys.", Vol. 64, No. 10, 1988, pages 5720—5722). Recently, the existence of $Sm_2Fe_{17}N_x$ as magnetic material has become known. This material has the known $Th_2Zn_{17}$ crystal structure, and its intrinsic properties are clearly better than those of $Nd_2Fe_{14}B$. Thus, for example, the anisotropy field at room temperature is about 20 T, the Curie temperature about 470° C., and the saturation magnetization about 1.54 T. For the production of $Sm_2Fe_{17}N_x$, the melting of $Sm_2Fe_{17}$ as the starting material is known. The preliminary product thus obtained is then heated in a $N_2$ or $NH_3$ atmosphere, with the desired hard magnetic phase forming by inclusion of up to 2.7N atoms per formula unit into the lattice structure of the preliminary product. Furthermore, by nitiriding the $Sm_2Fe_{17}$ preliminary product, a uniaxial magnetic anisotropy of the hard magnetic phase can be obtained. (See paper read by J. M. D. Coey at the convention of the "Nato Advanced Study Institute on the Science and Technology of Nanostructured Magnetic Materials", Jun. 25 to Jul. 7, 1990, Heraklion, Crete, Greece).

OBJECTS OF THE INVENTION

It is an object of the present invention to improve this known process for the production of a hard magnetic material on the basis of the substance system Sm—Fe—N so that the development of the desired hard magnetic phase in a relatively simple manner can be ensured and a material of high coercive field strength $H_{ci}$, in particular greater than 5 kA/cm, can be obtained, which permits the production of anisotropic compact Sm—Fe—N magnets.

These and other objects of the present invention will become apparent from the following description and claims in conjunction with the drawings.

SUMMARY OF THE INVENTION

According to the present invention, first a sintered body with the two-component Sm—Fe phase is produced as preliminary product from a Sm—Fe powder oriented in a magnetic field. Then this sintered body is transformed in a nitrogen atmosphere into the hard magnetic phase of the substance system Sm—Fe—N.

The present invention proceeds from the known fact that by the inclusion of N atoms within the known $Th_2Zn_{17}$ crystal structure, without alteration of the lattice type, a material can be obtained which possesses hard magnetic properties. To obtain an anisotropic compact material, according to the present invention, a preliminary product with the binary $Sm_2Fe_{17}$ phase is formed which is already crystallographically oriented. To this end, a powder, obtained by powder metallurgy methods known per se, of a prealloy corresponding to the preliminary product is prepared and is oriented in an applied magnetic field. Since the binary $Sm_2Fe_{17}$ phase has a planar anisotropy, the crystallographic c-axis is oriented during the orientation radial to the magnetic field. Thereafter a shaped body is produced by sintering from the oriented powder. This shaped body is then nitrided at elevated temperature. In so doing, the c-axis becomes the preferential axis of magnetization, also referred to as magnetically easy direction. In this manner, a compact product can be obtained from the desired hard magnetic material with a radial preferential orientation.

DETAILED DESCRIPTION

A detailed description of preferred embodiments of the present invention will now be provided with reference to the examples, and the drawings.

Figure 1:
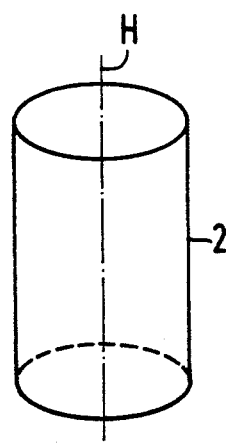
FIG. 1 schematically illustrates an oriented sintered body.

To obtain a compact, hard magnetic shaped body of the substance system Sm—Fe—N, first a preliminary product with a $Sm_2Fe_{17}$ phase in the form of a cylindrical sintered body 2 indicated schematically in FIG. 1 is produced. For this purpose, one starts with powders consisting of or containing the components involved, which are sufficiently pure (e.g., at least 99.5% purity). Either elementary powder is used, or alternatively the elements involved may be present in the form of alloys and/or compounds. The starting components—for example in powder form—of the preliminary product are then melted in an Ar atmosphere to a prealloy. The proportions of the individual components are chosen so that the prealloy has the composition $Sm_xFe_{100-x}$, x being between 10 and 20 (in atom-%). For inductive melting, pyrolytic BN or $Al_2O_3$ crucibles can be used. Also melting in an arc furnace is possible. For homogenization, the prealloy can be melted several times, and any Sm losses can be compensated by Sm additions. The prealloy thus melted, which ultimately has for example the composition $Sm_{2.2}Fe_{17}$, is then placed in a suitable milling apparatus, a so-called attritor, and is ground to average grain sizes between 0.2 $\mu m$, and 50 $\mu m$, preferably between 1 $\mu m$ and 10 $\mu m$.

Thereafter, the powder of the preliminary product is oriented under protective gas, e.g. Ar, in a DC magnetic field so that the crystallographic c-axis will be radial to the applied magnetic field.

Figure 2:
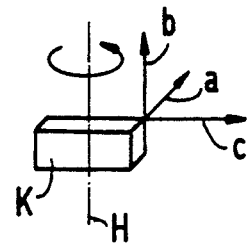
FIGS. 2, 3, and 4 schematically illustrate devices for nitriding the sintered body.

The magnetic field induction to be chosen for this orientation is generally between 0.2 Tesla and 2 Tesla, for example, approximately 1 Tesla. The magnetic field is to be oriented parallel to a dashed line marked H in FIG. 1. The crystal orientation occurring in the magnetic field treatment is illustrated in FIG. 2 wherein the magnetic field direction is again illustrated by a dashed line H, and the position of the individual axes of a crystal K by arrows marked a, b and c. Relative to the position of the system of the crystal axes shown in the figure, this system may be rotated about the line H.

The powder thus oriented in the magnetic field is subsequently, or alternatively during the orientation in the magnetic field, compacted by a mechanical pressing operation to a dense compact of a desired geometry, e.g., a cylindrical form. Advantageously, the pressing direction is chosen essentially perpendicular to the direction of the magnetic field. Alternatively, if desired, a pressing direction parallel to the magnetic field direction may be provided.

This compact is then sintered and transformed into the sintered body 2 illustrated in FIG. 1. The concrete sintering times and temperatures depend on the desired porosity or density of the sintered body. Generally, the sintering is performed at a temperature between 1000° C. and 1300° C., for example, at 1100° C. The sintering times are between 10 minutes and 10 hours, for example, for sintering at 1100° C., about one hour. It is to be noted that shorter times and lower temperatures lead to more porous sintered bodies, which are easier to nitride.

At the end of the sintering treatment, a corresponding compact preliminary product with a soft magnetic phase with a $Th_2Zn_{17}$ crystal structure is at hand. In a further step, this preliminary product is then annealed in a nitrogen atmosphere, to obtain the desired hard magnetic $Sm_2Fe_{17}N_x$ phase. It is to be noted that this compound exists for nitrogen concentrations x for which $0 < x \leq 3$ (x in N atoms per unit cell). Since above about 600° C. this phase is unstable, the annealing temperature to be chosen must be below that temperature and appropriately above 300° C. The nitriding, however, of compact bodies at the permissible temperatures proceeds very slowly. These times are reduced to a few hours if the sintered body has a density lower than 100%, because then the nitrogen can spread unhindered in cracks and pores of this body, and thus only the distance between adjacent cracks or pores must be overcome by diffusion.

Figure 3:
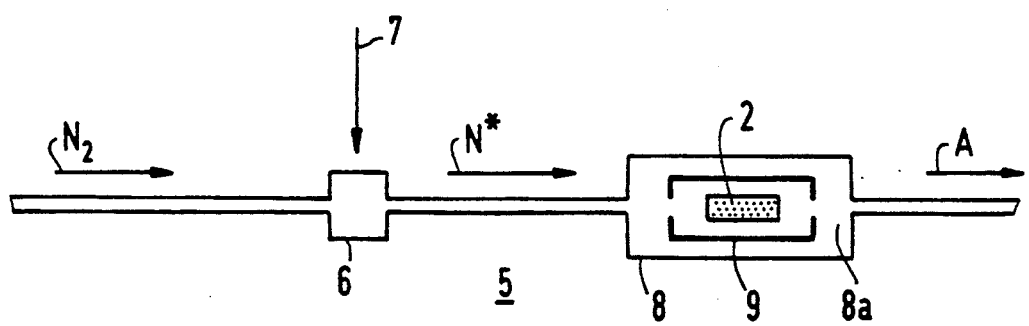

Also, it is of advantage to carry out the nitriding process in a reactive nitrogen atmosphere. A corresponding apparatus is shown schematically in FIG. 3 in section. With this apparatus, designated generally by 5, first molecular nitrogen $N_2$ is introduced into a reaction chamber 6 of a gas activation equipment in order to transform the $N_2$ into reactive components such as ionized atoms and molecules or free nitrogen radicals. Preferably microwave or RF excitation may be provided for this purpose. The respective energy feed into the reaction chamber 6 is indicated by an arrow line 7. The activated nitrogen, marked N*, is then supplied to a sintering furnace 8, where the sintered body 2 is disposed in the furnace interior 8a. The sintered body may be advantageously contained in a quartz vessel 9, which prevents recombination of the excited nitrogen atoms and molecules.

Further, the waste gas issuing from the sintering furnace 8 is indicated in the figure by an arrow line marked A. The times concretely to be chosen for the nitriding process with activated nitrogen depend on the nitriding temperature and in particular also on the density of the sintered body. Thus, for example, for sintered bodies of a density of 90 to 95%, the nitriding times are generally between 10 minutes and 1000 hours, preferably between 5 hours and 30 hours. For example, nitriding of a sintered body of a density of 90% at 500° C. for 10 hours is sufficient to obtain the desired hard magnetic $Sm_2Fe_{17}N_x$ phase in the end product, and at the same time to adjust the desired radial preferential direction of magnetization.

According to a concrete practical example, six cylindrical nitrided $Sm_{2.2}Fe_{17}$ specimens were produced. Each specimen had an axial length of 5 mm and a diameter of 3 mm. The magnetic values of these specimens measured in radial direction are listed in the following Table 1. $T_a$ is the temperature of the nitriding process, $t_a$ the respective annealing time of this process, $P_w$ the power of a microwave resonator for the formation of a reactive nitrogen atmosphere, $I_r$ the magnetic remanence, and $H_{ci}$ the coercive field strength. As can be seen, in particular, from a comparison of sample No. 6 with the other five sample numbers, in the absence of reactive nitrogen components ($P_w = 0$) clearly inferior magnetic values ($I_r$, $H_{ci}$) are obtained.

TABLE 1

| Sample No. | $T_a$ [°C.] | $t_a$ [h] | $P_w$ [W] | $I_r$ [T] | $H_{ci}$ [kOe] |
| --- | --- | --- | --- | --- | --- |
| 1 | 500 | 1 | 300 | 0.89 | 14.3 |
| 2 | 500 | 10 | 300 | 1.04 | 18.1 |
| 3 | 500 | 10 | 500 | 1.09 | 20.6 |
| 4 | 300 | 20 | 500 | 0.81 | 10.4 |
| 5 | 400 | 10 | 300 | 0.93 | 15.2 |
| 6 | 500 | 10 | 0 | 0.21 | 5.3 |

Figure 4:
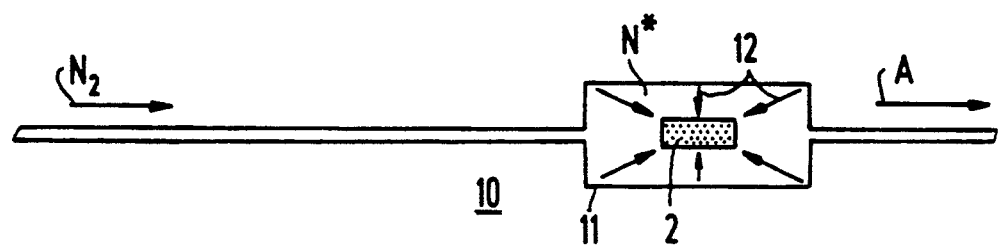

In FIG. 4, another apparatus is illustrated for carrying out the process according to the present invention. This apparatus, generally designated by 10, differs from the apparatus 5 illustrated in FIG. 3 only in that the device for the formation of the reactive nitrogen atmosphere is integrated in the sintering furnace. Accordingly, per FIG. 4, the sintered body 2 is in a microwave furnace 11, the respective energy feed into the sintered body being indicated by an arrow line 12.

According to the practical examples set forth, it was assumed that the nitriding of the sintered body is carried out at a single, relatively high temperature. It is to be noted, however, that if the nitration is too fast, for example, at a temperature above 500° C., the $Th_2Zn_{17}$ phase may possibly decompose. The reason for this is to be seen in that the thermal stability of the compound $Sm_2Fe_{17}N_x$ clearly decreases with decreasing N content. Thus, for example, the decomposition temperature for x=0.4 is approximately 100° C. lower than for x=2.94. For this reason, x values as high as possible (in the vicinity of x=3) must be regarded to be advantageous. The following Table 2 shows the clear dependence of the decomposition temperature $T_d$ [in ° C.] on the nitrogen concentration x [in atoms per unit cell]. The stated measured values are approximate values above which decomposition occurs (onset values):

TABLE 2

| x [N atoms per Unit Cell] | 0.5 | 1 | 1.5 | 2 | 2.5 |
|---|---|---|---|---|---|
| $T_d$ [°C.] | 602 | 627 | 643 | 659 | 673 |

Because of this dependence of the thermal stability of the $Sm_2Fe_{17}N_x$ compound on the nitrogen concentration, it is especially advantageous if the nitriding process of the sintered body forming the preliminary product is carried out in two stages with respect to the temperature conditions. For the first stage, a temperature lower, in particular, by at least 50° C. than for the second stage is chosen. A practical example of a respective two-stage nitration of a sintered body of predetermined density is set forth below.

FIRST NITRIDING STAGE

The nitration occurs at a temperature $T_{n1}$ between 300° C. and 400° C. for a period $t_{n1}$ between 10 and 1000 hours, the time concretely to be chosen depending on the density of the sintered body. That is, the denser the body is, the longer must be the nitriding times. The N loading, at least in the center of the sintered body, should be at least up to a concentration $x=1.5$. Respective samples are evident from the following Table 3.

TABLE 3

| Density [%] | 95 | 95 | 90 | 90 |
|---|---|---|---|---|
| $T_{n1}$ [°C.] | 400 | 350 | 400 | 350 |
| $t_{n1}$ [h] | 64 | 256 | 16 | 64 |

SECOND NITRIDING STAGE

Further loading with nitrogen occurs up to the maximum possible concentration of $x \leq 3$ at a temperature $T_{n2}$ which is higher than the temperature $T_{n1}$ of the first nitriding stage. For example, for a sintered body with a density of 90%, temperature $T_{n2}$ of 500° C. for a period $t_{n2}$ of 16 hours is provided.

In this two-stage nitriding process, advantageously the thermal stability of the $Sm_2Fe_{17}$ nitride is provided in the first nitriding step to the extent that the hard magnetic phase cannot decompose at the higher temperature $T_{n2}$ necessary in the second nitriding step for complete nitration.

Although preferred embodiments of the present invention have been described in detail, it is contemplated that variations may be made by those skilled in the art, all within the spirit and the scope of the present invention as defined in the claims.

What is claimed is:

1. In a process for the production of an anisotropic magnetic material based on a composition consisting essentially of Sm—Fe—N which has a crystalline hard magnetic phase with a $Th_2Zn_{17}$ crystal structure, wherein nitrogen atoms are incorporated into the crystal lattice, said process comprising producing a preliminary product with a two component Sm—Fe phase having the $Th_2Zn_{17}$ crystal structure, and subsequently heat treating the preliminary product in a nitrogen atmosphere, the improvement comprising:

orienting an Sm—Fe powder in a magnetic field;
producing a sintered body with a two-component Sm—Fe phase as a preliminary product, said sintered body being produced by means of compacting and sintering said oriented Sm—Fe powder;
transforming by heat treating the sintered body preliminary product in a nitrogen atmosphere into a body with a Sm—Fe—N hard magnetic phase.

2. A process according to claim 1 wherein said sintered body is produced by:
melting a prealloy having a two component Sm—Fe phase;
mechanically reducing the prealloy to powder, followed by said orienting of said powder in said magnetic field;
compacting said oriented powder and sintering the compacted powder to produce said sintered body.

3. A process according to claim 2 comprising milling said prealloy to said powder with an average grain size between 0.2 μm and 50 μm.

4. A process according to claim 3 wherein said average grain size is between 1 μm and 10 μm.

5. A process according to claim 2 wherein said compacting of said powder of said prealloy is done at least partially during said orienting of said powder in said magnetic field.

6. A process according to claim 5 wherein said powder is compacted substantially perpendicular to the magnetic field direction.

7. A process according to claim 1 comprising providing said magnetic field of said orienting step with a magnetic induction between 0.2 Tesla and 2 Tesla.

8. A process according to claim 1 comprising producing said sintered body by sintering at a temperature between 1000° C. and 1300° C.

9. A process according to claim 8 wherein said sintering is carried out for a period of between 10 minutes and 10 hours.

10. A process according to claim 1 wherein said nitrogen atmosphere wherein said Sm—Fe—N hard magnetic phase is formed is a nitrogen atmosphere containing activated nitrogen components.

11. A process according to claim 10 comprising forming said activated nitrogen components by microwave or RF excitation of molecular nitrogen.

12. A process according to claim 1 wherein said Sm—Fe—N hard magnetic phase is formed by heat treating said sintered body in said nitrogen atmosphere at a temperature between 300° C. and 600° C.

13. A process according to claim 12 wherein said heat treating is a two stage process comprising providing a first stage heat treating temperature lower than a second stage heat treating temperature.

14. A process according to claim 13 wherein said first stage heat treating is at a temperature between 300° C. and 400° C.

15. A process according to claim 12 comprising performing said heat treating for a total time period of between 10 minutes and 1000 hours, said time period being selected responsive to density of the sintered body.

16. A process according to claim 15 wherein said time period is between 5 hours and 30 hours.

* * * * *